(12) United States Patent
Kimura et al.

(10) Patent No.: US 8,513,830 B2
(45) Date of Patent: Aug. 20, 2013

(54) POWER SUPPLY APPARATUS FOR VEHICLE

(75) Inventors: Kenji Kimura, Miyoshi (JP); Shuji Tomura, Nagoya (JP); Masanori Ishigaki, Nagoya (JP); Takaji Umeno, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 287 days.

(21) Appl. No.: 13/020,891

(22) Filed: Feb. 4, 2011

(65) Prior Publication Data
US 2011/0187183 A1 Aug. 4, 2011

(30) Foreign Application Priority Data
Feb. 4, 2010 (JP) ................................. 2010-022898

(51) Int. Cl.
*B60L 15/32* (2006.01)
*B60L 11/18* (2006.01)

(52) U.S. Cl.
USPC .......................................... 307/10.1; 307/9.1

(58) Field of Classification Search
USPC ................................................ 307/9.1, 10.1
See application file for complete search history.

(56) References Cited

U.S. PATENT DOCUMENTS

| | | | |
|---|---|---|---|
| 6,025,695 A * | 2/2000 | Friel et al. ..................... | 320/106 |
| 6,608,396 B2 | 8/2003 | Downer et al. | |
| 6,713,894 B1 * | 3/2004 | Reimer et al. ............... | 307/10.1 |
| 7,115,332 B2 | 10/2006 | Tanjou | |
| 7,439,631 B2 | 10/2008 | Endou | |
| 7,584,813 B2 * | 9/2009 | Yoshida ..................... | 180/65.29 |
| 7,791,216 B2 * | 9/2010 | Xu et al. ........................ | 307/9.1 |
| 7,923,951 B2 * | 4/2011 | Soma et al. .................. | 318/376 |
| 7,924,562 B2 * | 4/2011 | Soma et al. .................. | 361/694 |
| 8,035,252 B2 | 10/2011 | Ichikawa et al. | |
| 2002/0158606 A1 | 10/2002 | King | |
| 2003/0222502 A1 | 12/2003 | Takahashi et al. | |
| 2004/0189226 A1 | 9/2004 | King | |
| 2004/0207205 A1 | 10/2004 | Kikuchi et al. | |
| 2006/0097671 A1 * | 5/2006 | Yoshida ........................ | 318/109 |
| 2009/0039703 A1 * | 2/2009 | Soma et al. .................. | 307/10.1 |
| 2009/0260668 A1 * | 10/2009 | Maeda .......................... | 136/205 |
| 2010/0038962 A1 | 2/2010 | Komatsu | |
| 2010/0181828 A1 | 7/2010 | Handa et al. | |

FOREIGN PATENT DOCUMENTS

| | | |
|---|---|---|
| CN | 1265534 A | 9/2000 |
| CN | 101573849 A | 11/2009 |
| JP | 4-271209 A | 9/1992 |
| JP | 06066204 U | 9/1994 |

(Continued)

OTHER PUBLICATIONS

Japanese Office Action Issued Jan. 31, 2012 from JP 2010-022898 with partial English translation.

*Primary Examiner* — Adi Amrany
(74) *Attorney, Agent, or Firm* — Gifford, Krass, Sprinkle, Anderson & Citkowski, P.C.

(57) ABSTRACT

A controller causes a first power converter and a second power converter to cooperate, and achieve bidirectional transmission of electric power between a first power storage device and an electric load, bidirectional transmission of electric power between a second power storage device and the electric load, and bidirectional transmission of electric power between the first power storage device and the second power storage device. This can provide a vehicle power supply apparatus which is equipped with the power storage devices having different characteristics and offers improved performance.

5 Claims, 7 Drawing Sheets

(56) References Cited

FOREIGN PATENT DOCUMENTS

| | | |
|---|---|---|
| JP | 07-245808 A | 9/1995 |
| JP | 8308025 A | 11/1996 |
| JP | 9-322314 A | 12/1997 |
| JP | 11-252711 A | 9/1999 |
| JP | 2003-219566 A | 7/2003 |
| JP | 3655277 A | 7/2003 |
| JP | 2003-282154 A | 10/2003 |
| JP | 2004-056995 A | 2/2004 |
| JP | 2004064840 A | 2/2004 |
| JP | 2004320872 A | 11/2004 |
| JP | 2007174867 A | 7/2007 |
| JP | 2008-060047 A | 3/2008 |
| JP | 2009-207312 A | 9/2009 |
| JP | 2010-004674 A | 1/2010 |
| JP | 2010016964 A | 1/2010 |
| WO | 2008/048028 A1 | 4/2008 |
| WO | 2009/013891 A1 | 1/2009 |

* cited by examiner

FIG.4

| COMBINATION | ENERGY TYPE POWER SUPPLY | POWER TYPE POWER SUPPLY |
|---|---|---|
| A | (1) HIGH-CAPACITY LITHIUM ION BATTERY | (3) HIGH-POWER TYPE LEAD BATTERY |
| B | (2) HIGH-CAPACITY NICKEL-METAL HYDRIDE BATTERY | (3) HIGH-POWER TYPE LEAD BATTERY |
| C | (1) HIGH-CAPACITY LITHIUM ION BATTERY | (5) HIGH-POWER LITHIUM ION BATTERY |
| D | (2) HIGH-CAPACITY NICKEL-METAL HYDRIDE BATTERY | (4) HIGH-POWER NICKEL-METAL HYDRIDE BATTERY |
| E | (1) HIGH-CAPACITY LITHIUM ION BATTERY<br>(2) HIGH-CAPACITY NICKEL-METAL HYDRIDE BATTERY | (7) ELECTRIC DOUBLE-LAYER CAPACITOR |
| F | (1) HIGH-CAPACITY LITHIUM ION BATTERY<br>(2) HIGH-CAPACITY NICKEL-METAL HYDRIDE BATTERY | (6) LITHIUM ION CAPACITOR |
| G | (6) LITHIUM ION CAPACITOR | (7) ELECTRIC DOUBLE-LAYER CAPACITOR |

FIG.8

AVAILABLE OUTPUT VALUE MAP

TEMPERATURE (°C) / SOC(%)

| | 0 | 5 | 10 | ......... | 50 | ......... | 100 |
|---|---|---|---|---|---|---|---|
| -30 | | | | | | | |
| -25 | | | | | | | |
| . . . | | | | | | | |
| 25 | | | | | POUT | | |
| . . . | | | | | | | |
| 60 | | | | | | | |

FIG.9

AVAILABLE INPUT VALUE MAP

TEMPERATURE (°C) / SOC(%)

| | 0 | 5 | 10 | ......... | 50 | ......... | 100 |
|---|---|---|---|---|---|---|---|
| -30 | | | | | | | |
| -25 | | | | | | | |
| . . . | | | | | | | |
| 25 | | | | | PIN | | |
| . . . | | | | | | | |
| 60 | | | | | | | |

POWER SUPPLY APPARATUS FOR VEHICLE

CROSS-REFERENCE TO RELATED APPLICATIONS

This nonprovisional application claims priority to Japanese Patent Application No. 2010-022898 filed on Feb. 4, 2010 with the Japan Patent Office, the entire contents of which are hereby incorporated by reference.

BACKGROUND OF THE INVENTION

1. Field of the Invention

The present invention relates to a power supply apparatus for a vehicle and particularly to a vehicle power supply apparatus equipped with a plurality of power storage devices.

2. Description of the Background Art

In recent years, vehicles equipped with a battery and a drive motor, such as an electric car and a hybrid car, are becoming a familiar sight. Equipping a vehicle with a plurality of batteries so as to achieve a longer battery-driven time period is under study.

Japanese Patent No. 3655277 discloses a power supply control system for using a high-voltage inverter-motor set with a low voltage battery module. This power supply control system for the electric traction motor includes at least one inverter for providing conditioned electric power to an electric traction motor and a plurality of power supply stages for providing DC power to the at least one inverter, each stage including a battery and a boost/buck DC-DC converter and the stages being wired in parallel. The power supply stages are controlled to maintain an output voltage to the at least one inverter.

An object of the technology disclosed in the above-described Japanese Patent No. 3655277 is to eliminate the discrepancy in state of charge (SOC) between a plurality of batteries. Although not specifically defined, use of a plurality of batteries having different input/output characteristics is not assumed, because unless the plurality of batteries have the same output characteristics, it is unlikely to make their respective states of charge uniform.

Further, in some cases, a voltage of a power storage device (including a battery and a capacitor as power storage devices) is boosted in order to allow the load to be efficiently operated, however, a voltage of a power storage device cannot be too lowered, since a boost converter has a limit of a voltage boost ratio.

SUMMARY OF THE INVENTION

An object of the present invention is to provide a vehicle power supply apparatus equipped with power storage devices having different characteristics and offers improved performance.

The present invention is summarized as a power supply apparatus for a vehicle for delivering and receiving electric power to and from an electric load installed on a vehicle. The power supply apparatus includes a first power storage device, a first positive bus connected to a positive electrode of the first power storage device, a first negative bus connected to a negative electrode of the first power storage device, a first power converter provided between the electric load and a first pair of buses made up of the first positive bus and the first negative bus, a second power storage device, a second positive bus connected to a positive electrode of the second power storage device, a second negative bus connected to a negative electrode of the second power storage device, and a second power converter provided between the first pair of buses and a second pair of buses made up of the second positive bus and the second negative bus.

Preferably, the power supply apparatus for a vehicle further includes a controller for controlling the first power converter and the second power converter. The controller causes the first power converter and the second power converter to cooperate, and achieve bidirectional transmission of electric power between the first power storage device and the electric load, bidirectional transmission of electric power between the second power storage device and the electric load, and bidirectional transmission of electric power between the first power storage device and the second power storage device.

Preferably, the second power storage device has a lower energy density and higher available input and output power than the first power storage device.

Preferably, the first power storage device and the second power storage device have respective available input and output power characteristics that change differently from each other with a change of temperature.

Preferably, the controller controls a state of charge of one of the first and second power storage devices such that the state of charge is not less than 50 percent relative to a full-charge state, and controls a state of charge of the other power storage devices such that the state of charge is less than 50 percent relative to a full-charge state.

More preferably, one power storage device with the state of charge controlled to be not less than 50 percent relative to the full-charge state has a superior output characteristic to the other power storage device with the state of charge controlled to be less than 50 percent with respect to the full-charge state. The other power storage device with the state of charge controlled to be less than 50 percent with respect to the full-charge state has a superior input characteristic to one power storage device with the state of charge controlled to be not less than 50 percent relative to the full-charge state.

According to the present invention, a vehicle power supply apparatus which is equipped with power storage devices having different characteristics and offers improved performance can be achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows exemplary combinations A to G of power storage devices.

FIG. 8 illustrates a map of available output value.

FIG. 9 illustrates a map of available input value.

DESCRIPTION OF THE PREFERRED EMBODIMENTS

Figure 1:
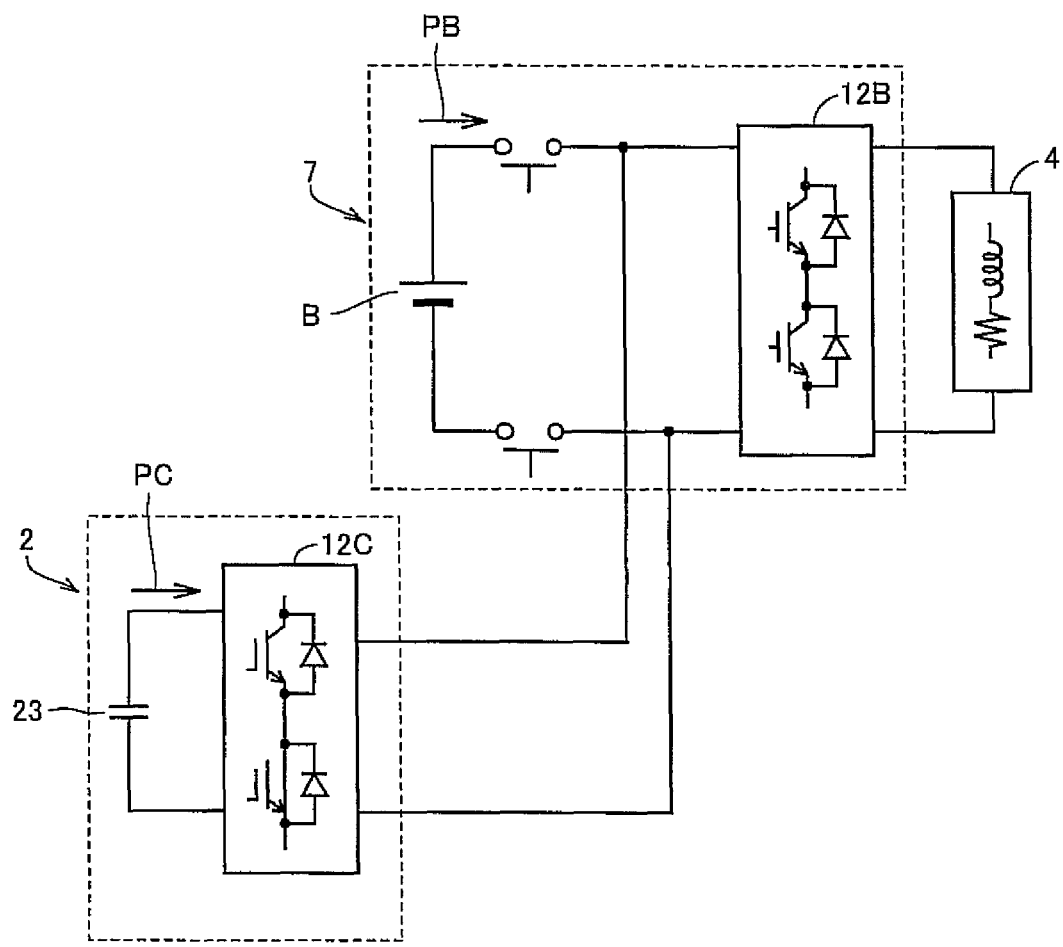
FIG. 1 illustrates a basic configuration of a power supply apparatus for a vehicle according to an embodiment of the present invention.

Embodiments of the present invention will be described below in detail with reference to the drawings. In the drawings, the same or corresponding portions are denoted by the same reference characters and description thereof will not be repeated.

Embodiment 1

FIG. 1 illustrates a basic configuration of a power supply apparatus for a vehicle of the present embodiment.

Referring to FIG. 1, a power supply apparatus for a vehicle of the present embodiment includes a main power supply 7 comprised of a main power storage device B (for example, a battery) and a power converter 12B and an auxiliary power supply 2 comprised of an auxiliary power storage device 23 (for example, a capacitor) and a power converter 12C. A plurality of auxiliary power supplies may be provided in parallel.

Power converter 12C has an input side connected to auxiliary power storage device 23 and an output side connected to a connection node of the main power storage device and power converter 12B.

Main power storage device B can bidirectionally deliver and receive electric power to and from vehicle electric load 4 via power converter 12B. Auxiliary power storage device 23 can bidirectionally deliver and receive electric power to and from vehicle electric load 4 via power converter 12C. Further, main power storage device B can bidirectionally deliver and receive electric power to and from auxiliary power storage device 23 via power converter 12C.

With such a configuration of a composite power supply system, a power converter (such as a boost converter, a buck converter and a boost/buck converter) allows the difference between power storage devices to be absorbed and input/output power of each power storage device to be independently controlled and exchanged with a load. Further, it also allows electric power to be exchanged between power storage devices.

Figure 2:
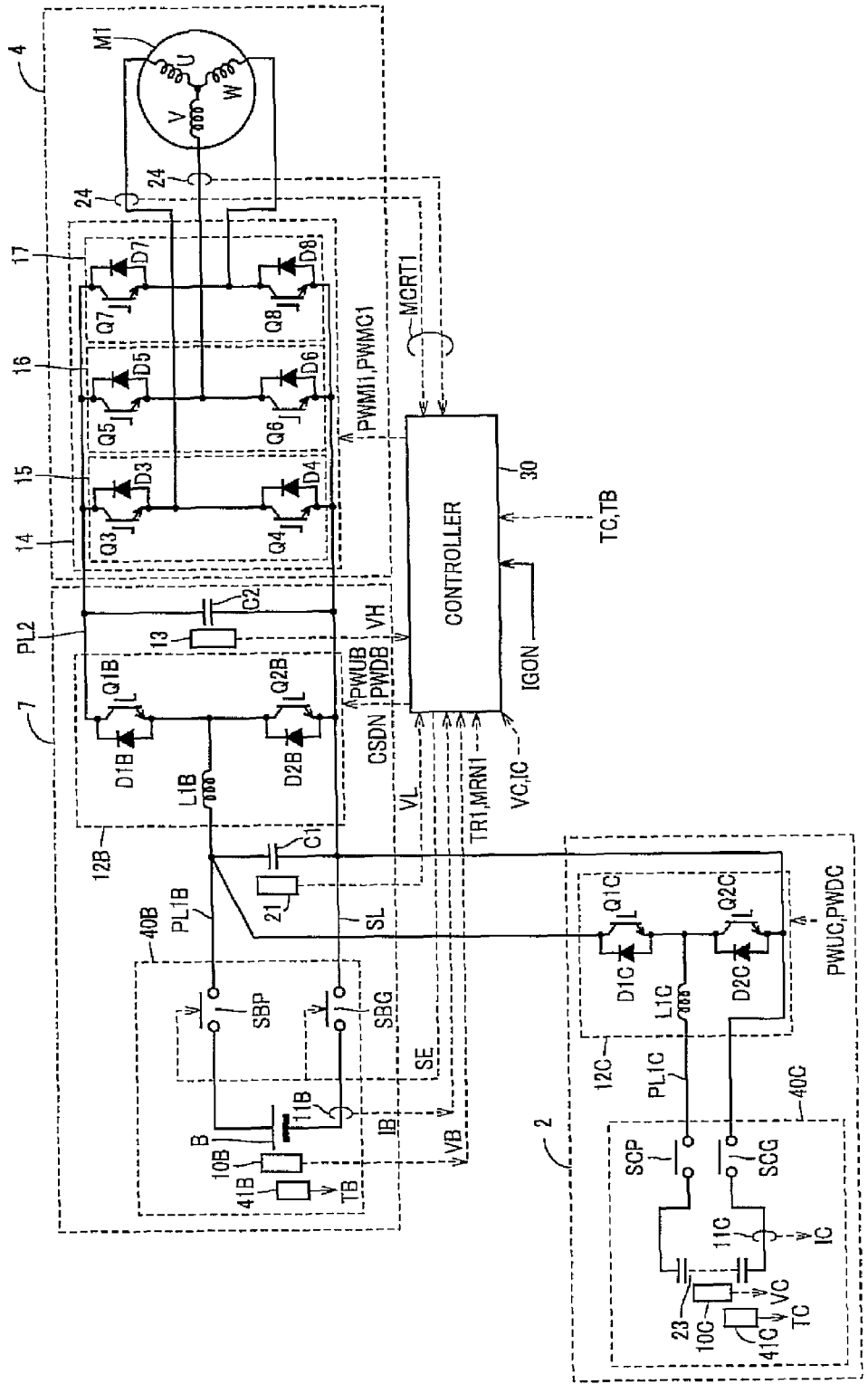
FIG. 2 is a circuit diagram illustrating a more detailed configuration of a vehicle equipped with a power supply apparatus for a vehicle according to an embodiment of the present invention.

FIG. 2 is a circuit diagram illustrating a more detailed configuration of a vehicle equipped with a power supply apparatus for a vehicle according to the present embodiment. FIG. 2 shows an example in which a secondary battery (a battery) is used as an example of main power storage device B, a capacitor is used as an example of auxiliary power storage device 23, and a boost converter is used as power converters 12B, 12C. Thus, corresponding elements will be denoted by the same reference characters as FIG. 1, even if they bear different designations.

Referring to FIG. 2, a vehicle according to the present embodiment includes main power supply 7, auxiliary power supply 2, vehicle electric load 4, and a controller 30.

Main power supply 7 includes a battery unit 40B, a boost converter 12B, smoothing capacitors C1, C2, and voltage sensors 13, 21. Auxiliary power supply 2 includes a capacitor unit 40C and a boost converter 12C. Vehicle electric load 4 includes an inverter 14 and a motor generator M1.

Smoothing capacitor C1 is connected between a power supply line PL1B and a ground line SL. Voltage sensor 21 senses a voltage VL across both ends of smoothing capacitor C1 and outputs it to controller 30. Boost converter 12B boosts a voltage across terminals of smoothing capacitor C1. Smoothing capacitor C2 smoothes a voltage boosted by boost converter 12B. Voltage sensor 13 senses a voltage VH across terminals of smoothing capacitor C2 and outputs it to controller 30.

Battery unit 40B is connected to power supply line PL1B and ground line SL. Battery unit 40B includes a battery B, a system main relay SBG connected between a negative electrode of battery B and ground line SL, and a system main relay SBP connected between a positive electrode of battery B and power supply line PL1B. A conductive/nonconductive state of system main relays SBP, SBG is controlled in response to a control signal SE supplied from controller 30.

Battery unit 40B further includes a voltage sensor 10B measuring a voltage VB across terminals of battery B and a current sensor 11B sensing current 1B through battery B. For battery B, for example, a secondary battery such as a high-capacity lithium ion battery can be used, which will be described in more detail below.

Capacitor unit 40C is connected to a power supply line PL1C and ground line SL. Capacitor unit 40C includes a large capacity capacitor 23 for storing electricity, a system main relay SCG connected between a negative electrode of capacitor 23 and ground line SL, and a system main relay SCP connected between a positive electrode of capacitor 23 and power supply line PL1C. A conductive/nonconductive state of system main relays SCP, SCG is controlled in response to control signal SE supplied from controller 30.

Capacitor unit 40C further includes a voltage sensor 10C measuring a voltage VC across terminals of capacitor 23 and a current sensor 11C sensing current IC through capacitor 23.

Boost converter 12B includes a reactor L1B having one end connected to power supply line PL1B, IGBT elements Q1B, Q2B connected in series between a power supply line PL2 and ground line SL, and diodes D1B, D2B connected in parallel to IGBT elements Q1B, Q2B, respectively.

The other end of reactor L1B is connected to the emitter of IGBT element Q1B and the collector of IGBT element Q2B. The cathode of diode D1B is connected to the collector of IGBT element Q1B, while the anode of diode D1B is connected to the emitter of IGBT element Q1B. The cathode of diode D2B is connected to the collector of IGBT element Q2B, while the anode of diode D2B is connected to the emitter of IGBT element Q2B.

Boost converter 12C includes a reactor L1C having one end connected to power supply line PL1C, IGBT elements Q1C, Q2C connected in series between power supply line PL2 and ground line SL, and diodes D1C, D2C connected in parallel to IGBT elements Q1C, Q2C, respectively.

The other end of reactor L1C is connected to the emitter of IGBT element Q1C and the collector of IGBT element Q2C. The cathode of diode D1C is connected to the collector of IGBT element Q1C, while the anode of diode D1C is connected to the emitter of IGBT element Q1C. The cathode of diode D2C is connected to the collector of IGBT element Q2C, while the anode of diode D2C is connected to the emitter of IGBT element Q2C.

Inverter 14 converts a DC voltage applied from boost converter 12B or 12C into a three-phase AC voltage and outputs it to motor generator M1.

Inverter 14 is connected to power supply line PL2 and ground line SL. Inverter 14 converts a DC voltage outputted by boost converters 12B and 12C into a three-phase AC voltage and outputs it to motor generator M1 that drives wheels. With regenerative braking, inverter 14 also returns electric power generated at motor generator M1 to boost converters 12B and 12C. At this time, boost converters 12B and 12C are controlled by controller 30 to operate as a step-down circuit.

Inverter 14 includes an U-phase arm 15, a V-phase arm 16 and a W-phase arm 17. U-phase arm 15, V-phase arm 16 and W-phase arm 17 are connected in parallel between power supply line PL2 and ground line SL.

U-phase arm 15 includes IGBT elements Q3, Q4 connected in series between power supply line PL2 and ground line SL and diodes D3, D4 connected in parallel to IGBT elements Q3, Q4, respectively. The cathode of diode D3 is connected to the collector of IGBT element Q3, while the anode of diode D3 is connected to the emitter of IGBT element Q3. The cathode of diode D4 is connected to the collector of IGBT element Q4, while the anode of diode D4 is connected to the emitter of IGBT element Q4.

V-phase arm 16 includes IGBT elements Q5, Q6 connected in series between power supply line PL2 and ground line SL and diodes D5, D6 connected in parallel to IGBT elements Q5, Q6, respectively. The cathode of diode D5 is connected to the collector of IGBT element Q5, while the anode of diode D5 is connected to the emitter of IGBT element Q5. The cathode of diode D6 is connected to the collector of IGBT element Q6, while the anode of diode D6 is connected to the emitter of IGBT element Q6.

W-phase arm 17 includes IGBT elements Q7, Q8 connected in series between power supply line PL2 and ground line SL and diodes D7, D8 connected in parallel to IGBT elements Q7, Q8, respectively. The cathode of diode D7 is connected to the collector of IGBT element Q7, while the anode of diode D7 is connected to the emitter of IGBT element Q7. The cathode of diode D8 is connected to the collector of IGBT element Q8, while the anode of diode D8 is connected to the emitter of IGBT element Q8.

The intermediate point of each phase arm is connected to each phase end of each phase coil of motor generator M1. That is, motor generator M1 is a three-phase, permanent magnetic synchronous motor, in which three coils of U, V and W-phase each have one end commonly connected to a mid point. Then, the other end of the U-phase coil is connected to a connection node of IGBT elements Q3, Q4. Further, the other end of the V-phase coil is connected to a connection node of IGBT elements Q5, Q6. Still further, the other end of the W-phase coil is connected to a connection node of IGBT elements Q7, Q8.

A current sensor 24 detects current through motor generator M1 as a motor current value MCRT1, and outputs motor current value MCRT1 to controller 30.

Controller 30 receives a torque command value TR1, the number of revolutions of a motor MRN1, each value of voltages VB, VC and VH and current IB, IC, a motor current value MCRT1 and an activation signal IGON. Controller 30 also receives temperatures TB, TC from temperature sensors 41B, 41C. Then, controller 30 outputs a control signal PWUP to effect a voltage boosting instruction, a control signal PWDB to effect a voltage step-down instruction and a signal CSDN instructing prohibition of the operation, to boost converter 12B.

Further, controller 30 outputs, to inverter 14, a drive instruction PWMI1 to convert a DC voltage outputted by boost converters 12B, 12C into an AC voltage for driving motor generator M1 and a regeneration instruction PWMC1 to convert an AC voltage generated at motor generator M1 into a DC voltage and return it to boost converters 12 B, 12C side.

Capacitor 23 is an power storage device having a larger capacity than smoothing capacitor C2, which includes, for example, a plurality of series-connected electric double layer capacitors. Note that an electric double layer capacitor has a high energy density, but withstands a voltage of the order of 2.5 to 2.7 V per cell. As such, for use with a voltage exceeding 100 V, it is necessary to use a plurality of electric double layer capacitor cells in series connection to cause each cell to share the voltage.

To allow vehicle electric load 4 to be efficiently operated, voltage VL is boosted to voltage VH by boost converter 12B. The difference between voltage VH and voltage VL cannot be made too large, since boost converter 12B has a limit of a voltage boost ratio. If predetermined voltage VH is required for efficient operation of vehicle electric load 4, then voltage VL cannot be too lowered. For example, when boosting voltage VH from 200 V to 600 V, if a limit of the voltage boost ratio is 4, then the minimum voltage of voltage VL is 150 V. If capacitor 23 should be connected to voltage VL, it would be necessary to increase the number of series connected capacitors in order to be able to withstand a voltage equal to or greater than 150 V. Consequently, the manufacturing cost of a vehicle would be increased.

In the circuit of the present embodiment, capacitor 23 is connected to power supply line PL1B and ground line SL via boost converter 12C, and further connected to electric load 4 via boost converter 12B. In this case, the voltage across the capacitor only has to be a voltage that can be boosted to voltage VH by boost converter 12C and boost converter 12B.

Assuming use of a boost converter capable of achieving a voltage boost ratio of up to 4, given that the maximum value of voltage VL is 200V, then four capacitors each having a withstand voltage of 50V (=200V/4) only has to be prepared, which reduces costs.

Figure 3:
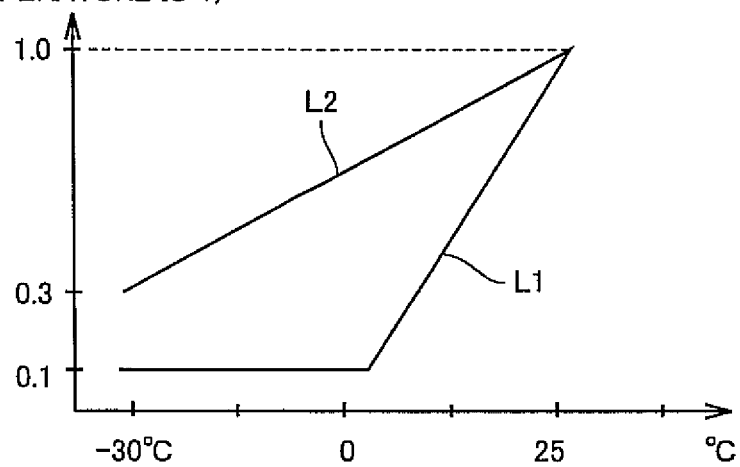
FIG. 3 illustrates effects of a combination of a main power supply and an auxiliary power supply.

FIG. 3 illustrates effects of a combination of a main power supply and an auxiliary power supply.

Referring to FIG. 3, the axis of ordinate shows temperature and the axis of abscissas shows available output power (power that can be output) of a battery when the power at normal temperature is 1. A line L1 shows characteristics of, for example, a lithium ion battery. It is characteristic of lithium ion batteries to have extreme difficulty in outputting power at a low temperature of 0° C. or lower. A line L2 shows characteristics of, for example, an electric double layer capacitor. The characteristic of line L2 also exhibits a decrease of available output power at a low temperature, but not to the extent of the characteristics of line L1. Therefore, available output power at a low temperature can be improved by using a power storage device having characteristics of line L1 (for example, a lithium ion battery) in combination with a power storage device having characteristics of line L2 (for example, an electric double layer capacitor).

Under present circumstances, secondary batteries used in, for example, a hybrid vehicle and an electric car offer lower input/output performance at a low temperature as compared to input/output performance at normal temperature. For this reason, when battery specifications are designed to meet performance requirements for a vehicle at normal temperature, the battery cannot input/output required power at a low temperature. Consequently, performance requirements for a vehicle (such as fuel efficiency, drivability and exhaust emission regulations) cannot be met.

Conversely, when battery specifications are designed to meet performance requirements for a vehicle at a low temperature, the resultant performance tends to be excessive at normal temperature, which results in a high cost. That is, if battery specifications are designed such that performance requirements for a vehicle are met by a single secondary battery, then the battery's characteristics as shown by line L1 of FIG. 3 cause performance requirements for a vehicle at a low temperature to determine the battery specifications. Then, the battery would offer an excessive performance at normal temperature.

As such, the combined use of another power storage device having input/output characteristics different from that of a secondary battery against temperature is contemplated. For example, an electric double layer capacitor (EDLC) has such characteristics that although it has a lower energy density as compared to a secondary battery, no chemical reaction is involved in charging/discharging, and therefore, it experiences a relatively small increase in an internal resistance even at a low temperature, and can input/output high power over a short time period. As such, input/output power request that is requested to a secondary battery at a low temperature can be reduced by having an electric double layer capacitor serving to input/output high power at a low temperature over a short time period. Consequently, a secondary battery can be made smaller in size.

Further examples of a combination of power storage devices having different characteristics will be presented.

FIG. 4 shows exemplary combinations A to G of power storage devices.

Shown in FIG. 4 as an exemplary combination A is an example employing (1) a high-capacity lithium ion battery for an energy type power supply and (3) a high-power type lead battery for a power type power supply. Exemplary combination A has an advantage of low temperature-dependency of input/output. Further shown is an exemplary combination B employing (2) a high-capacity nickel-metal hydride battery for an energy type power supply and (3) a high-power type lead battery for a power type power supply. Exemplary combination B has an advantage of low temperature-dependency of input/output, however, exemplary combination B is less advantageous than exemplary combination A for size reduction.

The requirements for the electric power and the amount of electric power which cannot be achieved by a single power storage device can be also met by using more than one power storage devices having different characteristics in combination as these examples.

Further, two power storage devices to be combined may be both lithium ion batteries, yet they have different characteristics. An exemplary combination C employing (1) a high-capacity lithium ion battery for the energy type power supply and (5) a high-power lithium ion battery for the power type power supply is shown.

(1) A high-capacity lithium ion battery is a common lithium ion battery using lithium cobalt oxide for positive electrode material. On the other hand, (5) a high-power lithium ion battery is a lithium ion battery using olivine lithium iron phosphate for positive electrode material.

Further, lithium ion batteries may be different in negative electrode material. When using a secondary battery, particularly a lithium ion battery for a power storage device, the combined use of more than one types of lithium ion batteries having difference in negative electrode material allows for improved input performance as well as reduced deterioration of output performance.

For example, a lithium ion battery using graphite for a negative electrode has a characteristic of a low negative electrode potential and an excellent output density, however, on the other hand, it also has a drawback in that it has a low current rate necessary to be below a potential of a metal lithium and a low resistance to deposition of lithium.

Further, it is a characteristic of a lithium ion battery using lithium titanium oxide for a negative electrode that it has a higher negative electrode potential as compared to a lithium ion battery using graphite for a negative electrode and that consequently, it has a higher current rate necessary to be below a potential of a metal lithium, which results in a high resistance to deposition of lithium and an excellent input density as well as excellent safety. On the other hand, due to its high open potential of a negative electrode, it has a lower output density as compared to a lithium ion battery using graphite for a negative electrode.

As such, a composite power supply system that uses the lithium ion battery using graphite for a negative electrode (hereinafter referred to as battery A1) in combination with the lithium ion battery using lithium titanium oxide for a negative electrode (hereinafter referred to as battery B1) is configured. In high-power charging, giving priority to the charging of battery B1 allows for prevention of deposition of lithium and secured input performance, while in high-power discharging, giving priority to the discharging of battery A1 allows for secured output performance.

Exemplary combination C that combines two types of lithium ion batteries in this manner has higher temperature-dependency of input/output than exemplary combinations A and B. Exemplary combination C, however, has an advantage that exemplary combination C is advantageous for size reduction.

The same as combination C applies to a nickel-metal hydride battery. FIG. 4 shows an exemplary combination D employing (2) a high-capacity nickel-metal hydride battery for an energy type power supply and (4) a high-power nickel-metal hydride battery for a power type power supply. Exemplary combination D is, though not to the extent of exemplary combination C, capable of size reduction and has less temperature dependency of input/output than exemplary combination C.

Further, FIG. 4 shows an exemplary combination E employing (1) a high-capacity lithium ion battery or (2) a high-capacity nickel-metal hydride battery for an energy type power supply and (7) an electric double layer capacitor for a power type power supply. It is a characteristic of (7) an electric double layer capacitor that it has a lower inner resistance as compared to a secondary battery and can be charged and discharged with large current within a short time period. Exemplary combination E has an advantage that it has low temperature-dependency of input/output and can be made small in size.

Further shown is an exemplary combination F employing (1) a high-capacity lithium ion battery or (2) a high-capacity nickel-metal hydride battery for an energy type power supply and (6) a lithium ion capacitor for a power type power supply. (6) A lithium ion capacitor is, for example, an asymmetrical type capacitor known as Premlis® using Nanogate Carbon® for a positive electrode and employing graphitic carbon for a negative electrode. Exemplary combination F has an advantage that though inferior to exemplary combination E, it has low temperature-dependency of input/output and can be made further smaller than exemplary combination E in size.

Further shown is an exemplary combination G employing (6) a lithium ion capacitor for an energy type power supply and (7) an electric double layer capacitor for a power type power supply. Exemplary combination G has an advantage that it has low temperature-dependency of input/output and can be made the largest in power, however, it is the largest in size.

As described above, the requirements for the electric power and the amount of electric power that cannot be achieved by a single power storage device can be also met by using more than one power storage devices having different characteristics in combination.

As a further example, for instance, an all-solid-state battery in which an organic electrolyte of the battery is replaced with an inorganic solid electrolyte may also be used. An all-solidstate battery has a problem of difficulty in using it with high power, because, despite its high energy density, it has a low input/output density. However, for example, use of an all-solid-state battery having a high energy density in combination with an electric double layer capacitor having a high input/output density to configure a composite power supply system enables absorption of power fluctuations to be performed at the electric double layer capacitor and delivery/receipt of energy to be performed at low rate between the all-solid-state battery and the electric double layer capacitor, thereby storing energy in the all-solid-state battery.

This allows the benefits of an all-solid-state battery, which is a high energy density, to be enjoyed by uses requiring input/output with high power, such as a hybrid vehicle and an electric car. Another example using an all-solid-state battery in combination with a liquid electrolyte can obtain the similar effects.

Embodiment 2

In a composite power supply system using more than one power storage devices, even if the system uses power storage devices of the same type rather than different types of power storage devices, the input/output performance can also be improved as compared to when using a single device, by utilizing change in input/output characteristics according to their states of charge.

Figure 5:
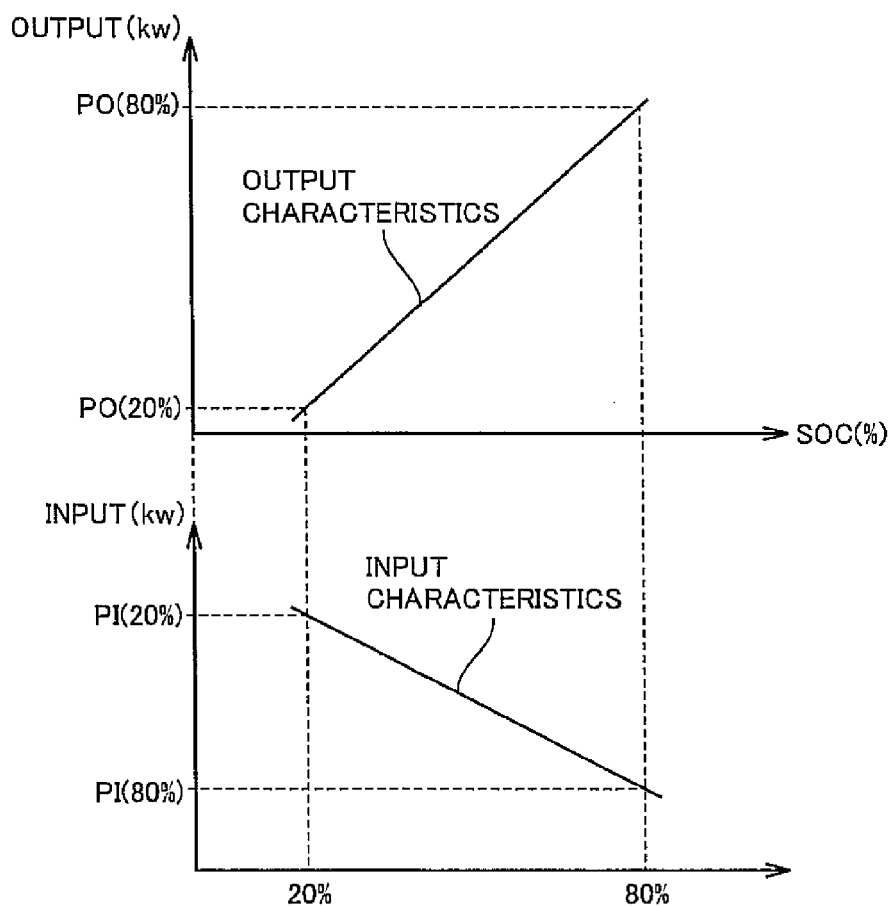
FIG. 5 shows an example of a relationship between SOC and input/output performance of a power storage device.

FIG. 5 shows an example of a relationship between SOC and input/output performance of a power storage device.

Referring to the upper section of FIG. 5, for example, in a certain type of lithium ion battery, as compared to 10-second output (electric power that can be output continuously for 10 seconds) PO (20%) of when SOC is 20%, 10-second output PO (80%) of when SOC is 80% is about ten-fold. In this case, the higher SOC is, the better output characteristics are. On the other hand, as shown in the lower section of FIG. 5, input performance PI (20%) of when SOC is 20% is about four-fold of input performance PI (80%) of when SOC is 80%. That is, the lower SOC is, the better input characteristics are.

Figure 6:
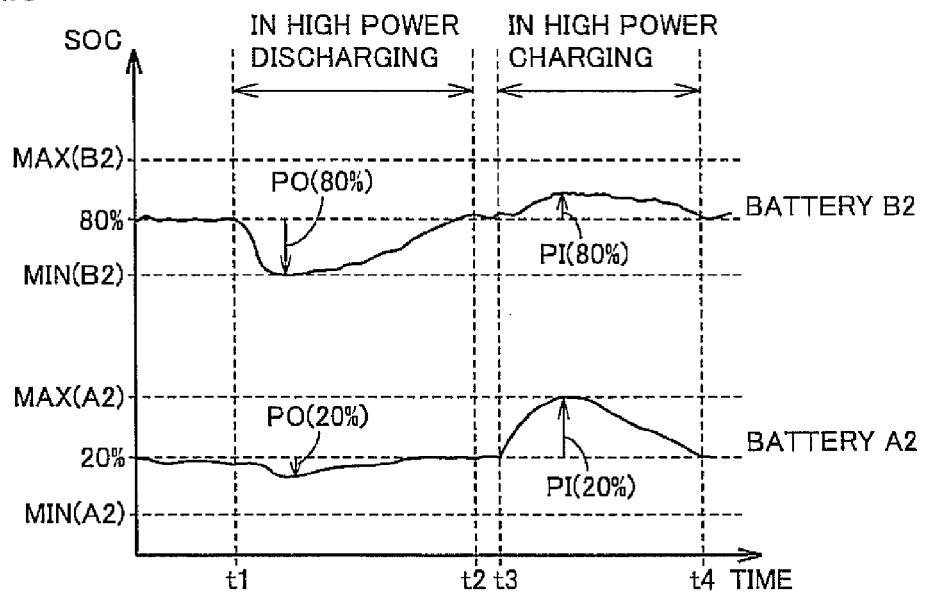
FIG. 6 is a waveform diagram illustrating control when using batteries A2, B2 having different SOCs in combination.

FIG. 6 is a waveform diagram illustrating control when using batteries A2, B2 having different SOCs in combination.

Referring to FIG. 6, temporal change of SOC in the case where a composite power supply system is configured using two lithium ion batteries of the same type will be described. SOC of one battery (hereinafter referred to as battery A2) is controlled to be around low SOC (for example SOC=20%) and between an upper limit value MAX (A2) and a lower limit value MIN (A2). SOC of the other battery (hereinafter referred to as battery B2) is controlled to be around high SOC (for example, SOC=80%) and between an upper limit value MAX (B2) and a lower limit value MIN (B2). Then, in high power discharging, priority is given to the outputting from battery B2 (time t1 to t2). On the contrary, in high power charging, priority is given to battery A2 (time t3 to t4). Controlling two power converters to set different target values of SOC for two power storage devices in this manner to charge/discharge a battery allows for higher power input/output as compared to the case where two power storage devices are controlled around the same SOC.

Embodiment 3

In Embodiment 3, in the composite power supply system as described in Embodiments 1 and 2, a share ratio K at which an auxiliary power supply shares request power P requested by an electric load is calculated, power converter 12B of a main power supply is controlled so that output power is $(1-K) \times P$, and power converter 12C of the auxiliary power supply is controlled so that output power is $K \times P$.

Figure 7:
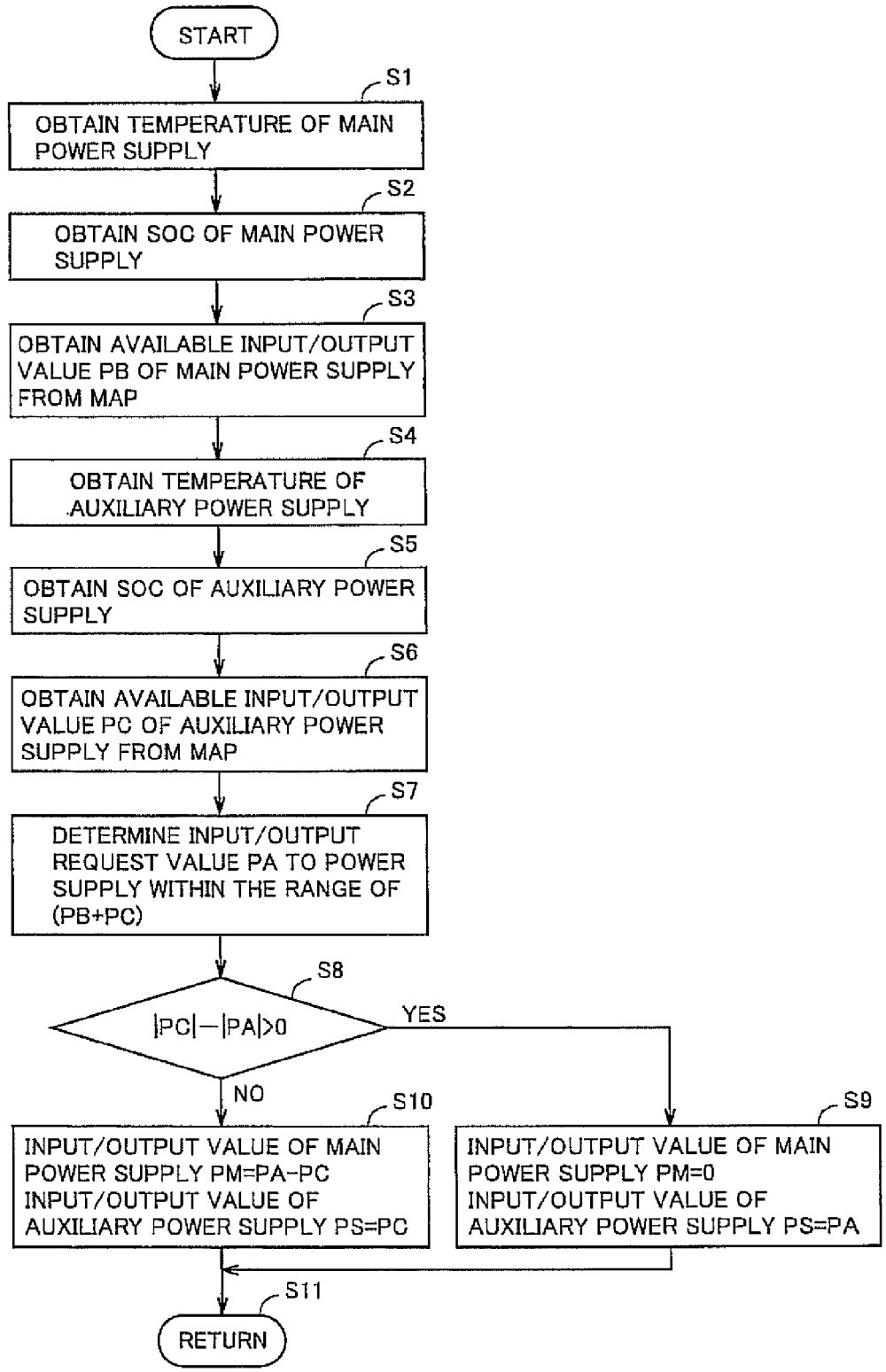
FIG. 7 is a flowchart illustrating control in which a controller determines a share ratio in Embodiment 3.

FIG. 7 is a flowchart illustrating control in which a controller determines a share ratio in Embodiment 3. The process of this flowchart is called from a predetermined main routine and executed at regular time intervals or every time when a predetermined condition is met.

Referring to FIGS. 1 and 7, first, in step S1, controller 30 obtains temperature TB of a main power supply (battery B). Temperature TB is being measured by temperature sensor 41B. Then, in step S2, controller 30 obtains SOC of the main power supply (battery B). SOC used here is one that is calculated based on, for example, voltage VB and summation of current IB. Then, in step S3, controller 30 obtains an available input/output value (value of electric power that can be input/output) PB of the main power supply (battery B) from a map.

Next, in step S4, controller 30 obtains temperature TC of an auxiliary power supply (capacitor 23). Temperature TC is being measured by temperature sensor 41C. Then, in step S5, controller 30 obtains SOC of the auxiliary power supply (capacitor 23). SOC used here is one that is calculated based on, for example, voltage VC and summation of current IC. Then, in step S6, controller 30 obtains an available input/output value PC of the auxiliary power supply (capacitor 23) from a map.

FIG. 8 illustrates a map of available output value.

FIG. 9 illustrates a map of available input value.

Referring to FIGS. 8 and 9, available input values PIN (kW) and available output values POUT (kW) are each stored in respective maps, for combinations of temperature of −30° C. to 60° C. and SOC of 0% to 100%. For example, data of PIN and POUT each corresponding to every 5° C. of temperature and every 5% of SOC are predetermined by, for example, an experiment and stored in respective maps. The available output map and the available input map are separately determined based on characteristics of each of a main power supply and an auxiliary power supply.

Referring again to FIG. 7, after available input/output value PB of the main power supply and available input/output value PC of the auxiliary power supply are obtained in steps S3 and S6, in step S7, an input/output request value PA to a power supply apparatus including the main power supply and the auxiliary power supply is determined within the range of PB+PC.

In step S8, whether the condition $|PC|-|PA|>0$ is true or not is determined. When $|PC|-|PA|>0$ is true, it is a case where it is only necessary to input request value PA to the auxiliary power supply or to output request value PA from the auxiliary power supply and there is no need to use the main power supply. In this case, in step S9, an input/output value PM of the main power supply is set as PM=0, while an input/output value PS of the auxiliary power supply is set as PS=PA.

On the other hand, when $|PC|-|PA|>0$ is not true, it is a case where request value PA cannot be accepted only by the auxiliary power supply or a case where request value PA cannot be output only by the auxiliary power supply. In such cases, it is necessary to use the main power supply. In this case, in step S10, input/output value PM of the main power supply is set as PM=PA−PC, while input/output value PS of the auxiliary power supply is set as PS=PC.

Although an example of the method for determining a share ratio has been given above, a share ratio may be set in other method as well. Setting a share ratio of an auxiliary power supply to control power converters by controller 30 allows the share ratio between a main power supply and an auxiliary power supply to be arbitrarily controlled.

Modification

It is noted that as to power converter 12B on the main power supply side of FIG. 1, voltage control is performed so that a voltage across output ends of vehicle electric load 4 may be at a predetermined value. At the same time, as to power converter 12C on the auxiliary power supply side, voltage may be controlled to deliver a predetermined electric power from auxiliary power storage device 23 toward vehicle electric load 4.

This allows vehicle electric load 4 to be operated at an efficient voltage for vehicle electric load 4 and any electric power to be delivered from an auxiliary power supply.

Finally, referring to FIGS. 1 and 2 for example, embodiments of the present invention will be generalized. A power supply apparatus for a vehicle for delivering and receiving electric power to and from an electric load installed on a vehicle (vehicle electric load 4) includes a first power storage device (battery B), a first positive bus connected to a positive electrode of the first power storage device, a first negative bus connected to a negative electrode of the first power storage device, a first power converter (boost converter 12B) provided between the electric load and a first pair of buses made up of the first positive bus and the first negative bus, a second power storage device (capacitor 23), a second positive bus connected to a positive electrode of the second power storage device, a second negative bus connected to a negative electrode of the second power storage device, and a second power converter (boost converter 12C) provided between the first pair of buses and a second pair of buses made up of the second positive bus and the second negative bus.

Preferably, the power supply apparatus for a vehicle further includes controller 30 for controlling the first power converter and the second power converter. Controller 30 causes the first power converter and the second power converter (boost converters 12B and 12C) to cooperate, and achieve bidirectional transmission of electric power between the first power storage device and the electric load, bidirectional transmission of electric power between the second power storage device and the electric load, and bidirectional transmission of electric power between the first power storage device and the second power storage device.

Preferably, the second power storage device has a lower energy density and higher available input and output power than the first power storage device. For example, the first power storage device can be a lithium ion battery and the second power storage device can be an electric double layer capacitor, however, other combination may be employed.

Preferably, as shown in FIG. 3, the first power storage device and the second power storage device have respective available input and output power characteristics that change differently from each other with a change of temperature.

Preferably, as illustrated in FIGS. 5 and 6, controller 30 controls a state of charge of one of the first and second power storage devices such that the state of charge is not less than 50 percent relative to a full-charge state, and controls a state of charge of the other power storage device such that the state of charge is less than 50 percent relative to a full-charge state.

More preferably, one power storage device with the state of charge controlled to be not less than 50 percent relative to the full-charge state has a superior output characteristic to the other power storage device with the state of charge controlled to be less than 50 percent relative to the full-charge state. The other power storage device with the state of charge controlled to be less than 50 percent relative to the full-charge state has a superior input characteristics to one power storage device with the state of charge controlled to be not less than 50 percent relative to the full-charge state.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power supply apparatus for a vehicle for delivering and receiving electric power to and from an electric load installed on a vehicle, comprising:
   a first power storage device;
   a first positive bus connected to a positive electrode of said first power storage device;
   a first negative bus connected to a negative electrode of said first power storage device;
   a first power converter provided between said electric load and a first pair of buses made up of said first positive bus and said first negative bus;
   a second power storage device;
   a second positive bus connected to a positive electrode of said second power storage device;
   a second negative bus connected to a negative electrode of said second power storage device;
   a second power converter provided between said first pair of buses and a second pair of buses made up of said second positive bus and said second negative bus; and
   a controller for controlling said first power converter and said second power converter; wherein
   said first power storage device includes a battery,
   said second power storage device includes a plurality of series-connected capacitors,
   said second power converter is configured to be operable so that a voltage between said first pair of buses is boosted higher than or equal to a voltage between said second pair of buses,
   said first power converter is configured to be operable so that a voltage provided on said electric load is boosted higher than or equal to the voltage between said first pair of buses,
   a withstand voltage of said plurality of series-connected capacitors is lower than a maximum voltage between said pair of buses,
   said controller
   (a) determines a request value that is lower than or equal to a total of each of available input/output range of said first and second power storage devices corresponding to a detected temperature,
   (b) causes said second power storage device to input/output power corresponding to said request value to/from said second power storage device when said request value is smaller than or equal to said available input/output range of said second power storage device, and
   (c) causes said second power storage device to input/output power corresponding to an upper limit of said available input/output range to/from said second power storage device and to input/output power corresponding to difference between said request value and said upper limit to/from said first power storage device when said request value exceeds said available input/output range of said second power storage device.

2. The power supply apparatus for a vehicle according to claim 1, wherein said controller causes said first power converter and said second power converter to cooperate, and achieve bidirectional transmission of electric power between said first power storage device and said electric load, bidirectional transmission of electric power between said second power storage device and said electric load, and bidirectional transmission of electric power between said first power storage device and said second power storage device.

3. The power supply apparatus for a vehicle according to claim 1, wherein said first power storage device and said second power storage device have respective available input/ output power characteristics that change differently from each other with a change of temperature.

4. The power supply apparatus for a vehicle according to claim 1, wherein said controller controls a state of charge of one of said first and second power storage devices such that the state of charge is not less than 50 percent relative to a full-charge state, and controls a state of charge of the other power storage devices such that the state of charge is less than 50 percent relative to a full-charge state.

5. The power supply apparatus for a vehicle according to claim 4, wherein
   said one power storage device with the state of charge controlled to be not less than 50 percent relative to the full-charge state has a superior output characteristic to said other power storage device with the state of charge controlled to be less than 50 percent relative to the full-charge state, and
   said other power storage device with the state of charge controlled to be less than 50 percent relative to the full-charge state has a superior input characteristic to said one power storage device with the state of charge controlled to be not less than 50 percent relative to the full-charge state.

\* \* \* \* \*